United States Patent
Okamoto et al.

(10) Patent No.: US 9,067,270 B2
(45) Date of Patent: Jun. 30, 2015

(54) HEAT EXCHANGER AND METHOD OF JOINING HEAT EXCHANGER PIPE

(75) Inventors: Takashi Okamoto, Kariya (JP); Tomoya Hirano, Oyama (JP)

(73) Assignees: KABUSHIKI KAISHA TOYOTA JIDOSHOKKI, Aichi-ken (JP); SHOWA DENKO K.K., Tokyo (JP)

( * ) Notice: Subject to any disclaimer, the term of this patent is extended or adjusted under 35 U.S.C. 154(b) by 385 days.

(21) Appl. No.: 13/428,492

(22) Filed: Mar. 23, 2012

(65) Prior Publication Data
US 2012/0247741 A1 Oct. 4, 2012

(30) Foreign Application Priority Data

Mar. 28, 2011 (JP) ................................. 2011-070378

(51) Int. Cl.
| | |
|---|---|
| *B23K 31/00* | (2006.01) |
| *B23K 1/00* | (2006.01) |
| *B23K 3/08* | (2006.01) |
| *B23K 37/04* | (2006.01) |
| *F28D 7/10* | (2006.01) |

(52) U.S. Cl.
CPC ......... *B23K 1/0012* (2013.01); *Y10T 29/49393* (2015.01); *Y10T 29/49368* (2015.01); *Y10T 29/49373* (2015.01); *Y10T 29/4935* (2015.01); *B23K 3/087* (2013.01); *B23K 37/0443* (2013.01); *B23K 2201/14* (2013.01); *F28F 2275/045* (2013.01); *F28D 7/106* (2013.01)

(58) Field of Classification Search
CPC .. B23K 1/0012; B23K 3/087; B23K 37/0443; B23K 2201/14; F28D 7/106; F28D 2275/045; Y10T 29/4935; Y10T 29/49373; Y10T 29/49368; Y10T 29/49393

USPC ......... 29/890.03, 890.032, 890.038, 890.039, 29/890.04, 890.043, 890.054, 458, 463, 29/527.2, 530; 165/133, 157, 162, 168, 165/170

See application file for complete search history.

(56) References Cited

U.S. PATENT DOCUMENTS 5,685,075 A    11/1997   Kato

FOREIGN PATENT DOCUMENTS

| CN | 1130887 A | 9/1996 |
|---|---|---|
| JP | 52-150855 A | 12/1977 |

(Continued)

OTHER PUBLICATIONS

Japanese Office Action dated Apr. 30, 2013 issued in Japanese Patent Application No. 2011-070378.

(Continued)

*Primary Examiner* — Ryan J Walters
(74) *Attorney, Agent, or Firm* — Sughrue Mion, PLLC

(57) ABSTRACT

A heat exchanger comprises a first plate and a second plate. A coolant flow passage is formed by brazing the first plate and the second plate by use of a first brazing filler metal. A pipe is brazed between a first groove portion provided in the first plate and a second groove portion provided in the second plate by use of a second brazing filler metal. A pair of first flanges provided contiguously with the first groove portion. Each of the first flanges includes an inner surface. A pair of second flanges provided contiguously with the second groove portion. Each of the second flanges includes an inner surface. At least one of the inner surfaces of the first flanges and the inner surfaces of the second flanges is covered with the second brazing filler metal. The first and second flanges are held by jigs upon brazing of the pipe.

2 Claims, 4 Drawing Sheets

(56) References Cited

FOREIGN PATENT DOCUMENTS

| JP | 02-274373 A | 8/1980 |
| JP | 2004-017061 A | 1/2004 |
| JP | 2005-144523 A | 6/2005 |
| JP | 2008-224134 A | 9/2008 |
| JP | 2008-260049 A | 10/2008 |

OTHER PUBLICATIONS

Chinese Office Action for corresponding CN Patent Application No. 201210080144.3 dated Nov. 14, 2013.

Communication dated Jul. 18, 2014, from the State Intellectual Property Office of The People's Republic of China in counterpart Chinese Application No. 201210080144.3.

HEAT EXCHANGER AND METHOD OF JOINING HEAT EXCHANGER PIPE

BACKGROUND OF THE INVENTION

The present invention relates to a heat exchanger and a method of joining a heat exchanger pipe.

As a heat exchanger for cooling an electronic part having a high heat value such as a power transistor, a heat exchanger configured by brazing a pipe to both ends of a body portion including a pair of plates has been known.

As depicted in FIG. 1, a heat exchanger 100 includes a body portion 101 having two plates 102 brazed at the same time. A pipe 103 is joined to the body portion 101 to allow a coolant to flow from the pipe 103 to the body portion 101. Incidentally, in the heat exchanger 100 depicted in FIG. 1, edges 105 of groove portions 104 are formed into an arc shape (rounded shape). Accordingly, the groove portions 104 cannot fully cover the pipe 103 when the plates 102 are stacked. As a result, gaps 106 are generated between the pipe 103 and the plates 102, which is a cause of a joint failure. Thus, in JP2008-224134A, edges 123 of groove portions 122 in plates 121 are formed at right angles as depicted in FIG. 2. This allows for stabilization of the braze by minimizing gaps when a pair of plates 121 is stacked and a pipe 124 is fitted to the groove portions 122.

SUMMARY OF THE INVENTION

Considering the abrasion and accuracy of a die, forming the edges 123 of the groove portions 122 in the plates 121 at right angles is not suitable for mass production due to difficulty in the management. Moreover, even if there is no gap at the initial stage, gaps may be generated between the plates and the pipe due to the thermal expansion of the plates under high temperature (for example, 600° C.)

An object of the invention is to provide a heat exchanger substantially prevented from formation of gaps between plates and a pipe, and a method of joining a pipe of the heat exchanger.

In first aspect of the invention, a heat exchanger comprising: a body portion including a first plate and a second plate, each of the first and second plates having a mating surface, wherein a coolant flow passage is formed by brazing the first plate and the second plate by use of a first brazing filler metal covering the mating surface of at least one of the first plate and the second plate; a first groove portion provided in the first plate, wherein the first groove portion includes an inner surface; a second groove portion provided in the second plate, wherein the second groove portion includes an inner surface; a pipe brazed between the first groove portion and second groove portion by use of a second brazing filler metal covering the inner surface of the first groove portion and the inner surface of the second groove portion; a pair of first flanges provided contiguously with the first groove portion in a direction approximately orthogonal to a laminated direction of the first and second plates and an axial direction of the pipe, wherein each of the first flanges includes an inner surface; and a pair of second flanges provided contiguously with the second groove portion in a direction approximately orthogonal to the laminated direction of the first and second plates and the axial direction of the pipe wherein each of the second flanges includes an inner surface, is provided. At least one of the inner surfaces of the first flanges and the inner surfaces of the second flanges is covered with the second brazing filler metal. The first and second flanges are held by jigs upon brazing of the pipe.

In second aspect of the invention, a method of joining a heat exchanger pipe, is provided. The heat exchanger included a body portion including a first plate and a second plate, each of the first and second plates having a mating surface, wherein a coolant flow passage is formed by brazing the first plate and the second plate by use of a first brazing filler metal covering the mating surface of at least one of the first plate and the second plate; a first groove portion provided in the first plate, wherein the first groove portion includes an inner surface; a second groove portion provided in the second plate, wherein the second groove portion includes an inner surface; and a pipe brazed between the first groove portion and second groove portion by use of a second brazing filler metal covering the inner surface of the first and the inner surface of the second groove portions. The method comprises covering, with the second brazing filler metal, at least one of inner surfaces of a pair of first flanges and inner surfaces of a pair of the second flanges. The pair of first flanges is provided contiguously with the first groove portion in a direction approximately orthogonal to a laminated direction of the first and second plates and an axial direction of the pipe. The pair of second flanges is provided contiguously with the second groove portion in a direction approximately orthogonal to the laminated direction of the first and second plates and the axial direction of the pipe. The method further comprises placing the pipe between the first groove portion and second groove portion with the second brazing filler metal interposed between the pipe and each of the first and second groove portions; holding the first and second flanges by jigs with the second brazing filler metal interposed between each of the first and second flanges and the jigs; and brazing by melting and cooling the second brazing filler metal.

In third aspect of the invention, a heat exchanger comprising: a body portion including a first plate and a second plate, each of the first and second plates having a mating surface, wherein a coolant flow passage is formed by brazing the first plate and the second plate by use of a first brazing filler metal covering the mating surface of at least one of the first plate and the second plate; a first groove portion provided in the first plate, wherein the first groove portion includes an inner surface; a second groove portion provided in the second plate, wherein the second groove portion includes an inner surface; a pipe brazed between the first groove portion and second groove portion by use of a second brazing filler metal covering the inner surface of the first and the inner surface of the second groove portions; a pair of first flanges provided contiguously with the first groove portion in a direction approximately orthogonal to a laminated direction of the first and second plates and an axial direction of the pipe, wherein each of the first flanges includes an inner surface; and a pair of second flanges provided contiguously with the second groove portion in a direction approximately orthogonal to the laminated direction of the first and second plates and the axial direction of the pipe wherein each of the second flanges includes an inner surface, is provided. At least one of the inner surfaces of the first flanges and the inner surfaces of the second flanges is covered with the second brazing filler metal. A gap between the first and second groove portions and the pipe is filled with the second brazing filler metal.

DESCRIPTION OF THE PREFERRED EMBODIMENTS

An embodiment of the present invention will be described with reference to FIGS. 3A to 6.

Figure 1:
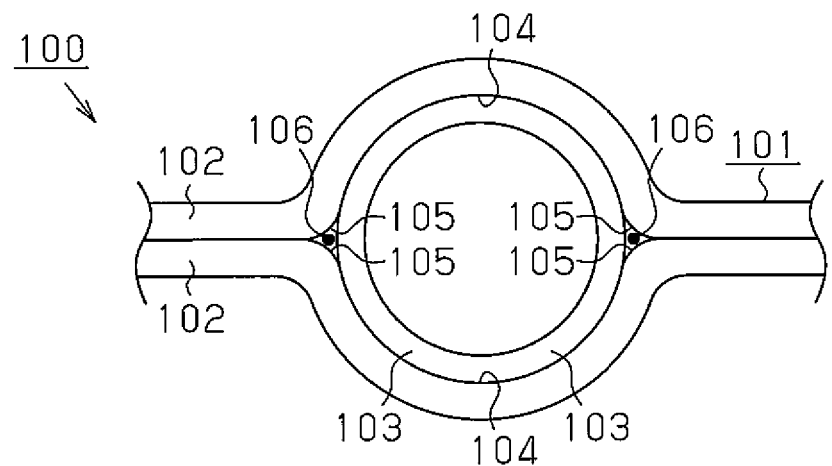
FIG. 1 is a front view of a heat exchanger for explaining prior art.
Figure 2:
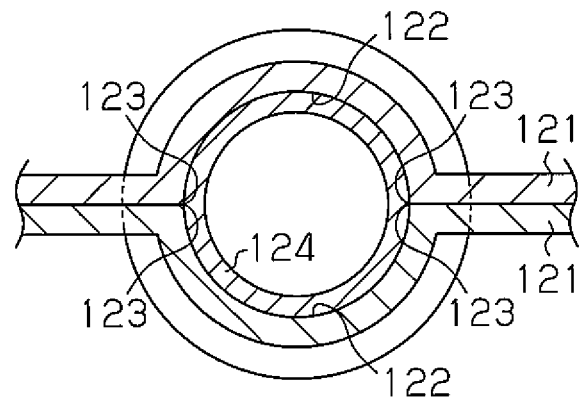
FIG. 2 is a cross-sectional view of a heat exchanger for explaining prior art.
Figure 3A:
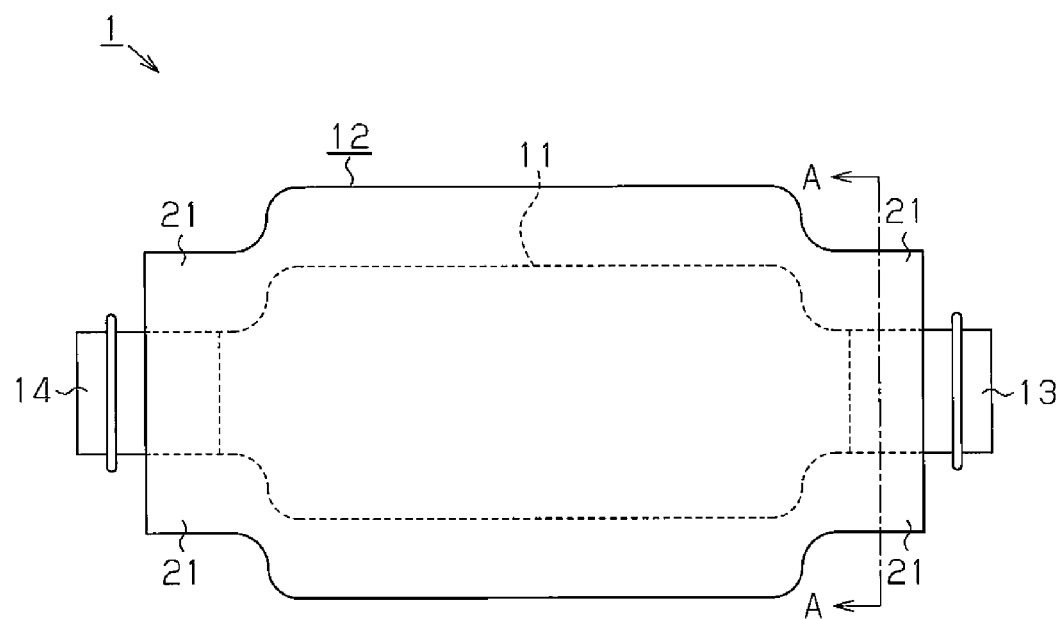
FIG. 3A is a plan view of a heat exchanger of an embodiment.
Figure 3B:
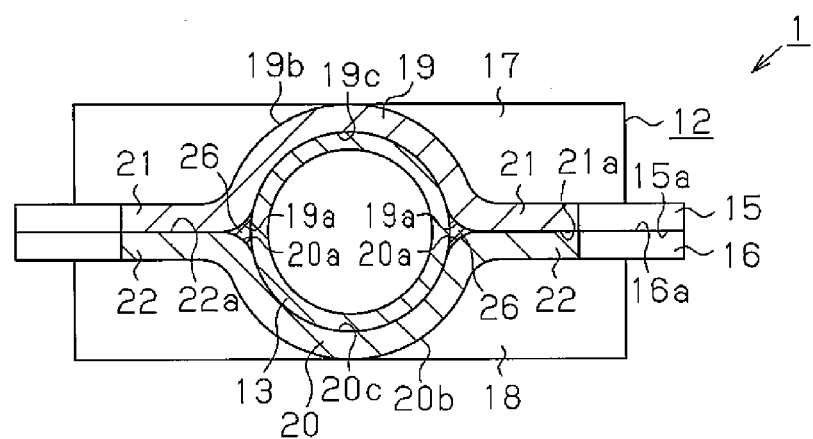
FIG. 3B is a cross-sectional view of the heat exchanger taken along the A-A line of FIG. 3A.

As depicted in FIGS. 3A and 3B, a heat exchanger 1 includes a body portion 12 and pipes 13 and 14. A first plate 15 and a second plate 16 are brazed to form a coolant flow passage 11 in the body portion 12. Specifically, case portions 17 and 18 each having a recess are formed in the first and second plates 15 and 16, and outer peripheries of the first and second plates 15 and 16 are brazed with brazing filler metals; accordingly, the coolant flow passage 11 is formed between both the plates 15 and 16.

The coolant flow passage 11 extends in a horizontal direction in FIG. 3A. Moreover, non-illustrated inner fins are housed in the coolant flow passage 11.

The pipes 13 and 14 are brazed to right and left ends of the body portion 12. Specifically, a first groove portion 19 that is generally semicircular when viewed from the front is formed continuously with the case portion 17 in areas where the pipes 13 and 14 are brazed to the first plate 15. Similarly, a second groove portion 20 that is generally semicircular when viewed from the front is formed continuously with the case portion 18 in areas where the pipes 13 and 14 are brazed to the second plate 16. End portions of the pipes 13 and 14 are placed between the first and second groove portions 19 and 20 to be brazed. In other words, the end portions of the pipes 13 and 14 are placed in a joint with the body portion 12 with brazing filler metals interposed therebetween.

A coolant is supplied from the pipe 13 on one side to the coolant flow passage 11, flows through the coolant flow passage 11 along an extending direction and is drained from the pipe 14 on the other side.

Moreover, pairs of first and second flanges 21 and 22 are formed on the periphery of the first and second groove portions 19 and 20. The first and second flanges 21 and 22 are held by jigs upon brazing. A pair of the first flanges 21 is provided contiguously with the first plate 15 in a direction orthogonal to a laminated direction of the first and second plates 15 and 16 and an axial direction of the pipes 13 and 14. Moreover, a pair of the second flanges 22 is provided contiguously with the second plate 16 in a direction orthogonal to the laminated direction of the first and second plates 15 and 16 and the axial direction of the pipes 13 and 14.

Upon brazing, outer circumference surfaces 19b and 20b of the first and second groove portions 19 and 20 are held by jigs in addition to the first and second flanges 21 and 22.

A method of joining a pipe of the heat exchanger 1 will be described with reference to FIGS. 4 to 6.

First, the first plate 15, the second plate 16 and the pipes 13 and 14 are prepared. In this case, edges 19a and 20a of the first and second groove portions 19 and 20 are formed into arc shapes (curves) when viewed from the front. The arc shape is a common arc formed when a plate is processed by pressing (for example, the radius is 0.5 mm).

Then, the first plate 15, the second plate 16 and the pipes 13 and 14 are brazed together.

Figure 4:
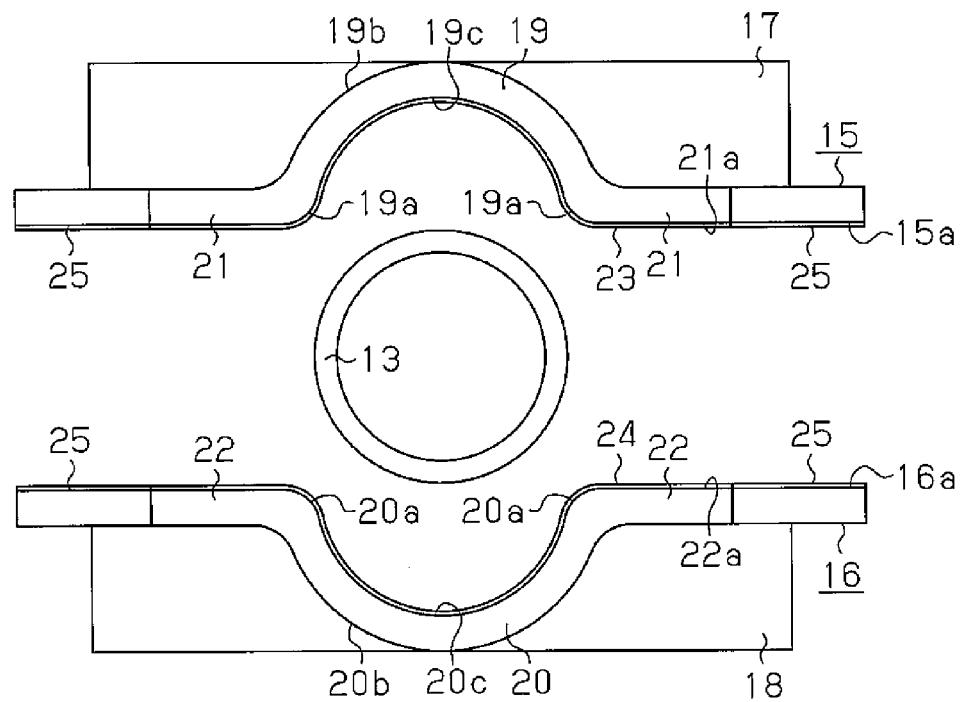
FIG. 4 is an exploded front view of the heat exchanger.

Specifically, as depicted in FIG. 4, second brazing filler metals 23 and 24 are placed in a manner to cover inner surfaces 19c and 20c of the first and second groove portions 19 and 20 and inner surfaces 21a and 22a of the first and second flanges 21 and 22. Additionally, the pipe 13 (14) is placed between the first and second groove portions 19 and 20 with the second brazing filler metals 23 and 24 interposed between the pipe and the first and second groove portions. Moreover, first brazing filler metals 25 are placed on the outer peripheries of the plates 15 and 16 in such a manner as to cover mating surfaces 15a and 16a, which are surfaces facing each other. The plates 15 and 16 are used by covering with brazing filler metals in this embodiment, the plates 15 and 16 may be clad metals that are previously covered with brazing filler metals.

Figure 5:
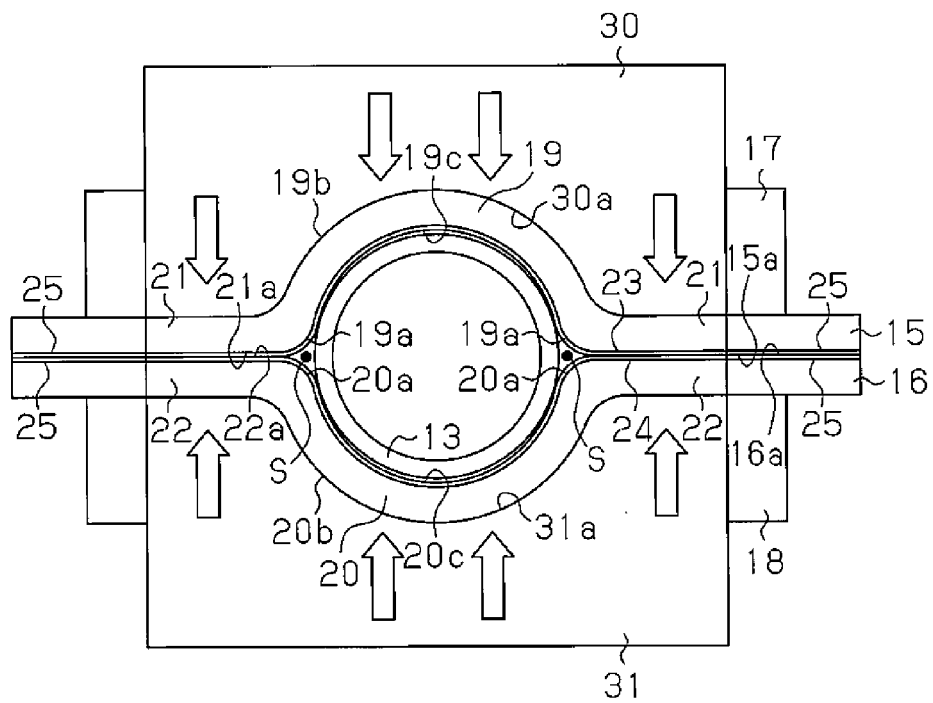
FIG. 5 is a front view of the heat exchanger before brazing.

As depicted in FIG. 5, the second plate 16 is subsequently placed in a lower jig 31. In this case, the second plate 16 is placed so that the outer circumference surface 20b of the second groove portion 20 and the second flange 22 fit to the lower jig 31. Subsequently, the first plate 15 is placed. In this case, the first and second flanges 21 and 22 are placed to face to each other, and the pipe 13 (14) fits to the first groove portion 19. Lastly, the first plate 15 is placed in an upper jig 30. In this case, the first plate 15 is placed so that the outer circumference surface 19b of the first groove portion 19 and the first flange 21 fit to the upper jig 30.

The above comprises the placement step.

The jigs 30 and 31 have shapes to fit to the outer circumference surfaces 19b and 20b of the first and second groove portions 19 and 20 and the first and second flanges 21 and 22. In other words, when the jigs 30 and 31 make contact with the plates 15 and 16, contact surfaces 30a and 31a of the jigs 30 and 31 come into contact with the entire surfaces of the outer circumference surfaces 19b and 20b of the first and second groove portions 19 and 20 and the entire surfaces of the first and second flanges 21 and 22.

The outer circumference surfaces 19b and 20b of the first and second groove portions 19 and 20 and the first and second flanges 21 and 22 are held by the upper and lower jigs 30 and 31.

In this state, brazing is performed under high temperature (for example, 600° C.). In this regard, since the edges 19a and 20a of the first and second groove portions 19 and 20 have arc shapes when viewed from the front, both of the plates 15 and 16 cannot cover the pipe 13 (14) fully in this state. Accordingly, a gap S is generated between the pipe 13 (14) and the first and second groove portions 19 and 20.

Additionally, by elevating the temperature (for example, 600° C.) in a state where the jigs 30 and 31 hold the outer circumference surfaces 19b and 20b of the first and second groove portions 19 and 20 and the first and second flanges 21 and 22, the first brazing filler metals 25 and the second brazing filler metals 23 and 24 are melted and liquefied.

Figures 6, 7:
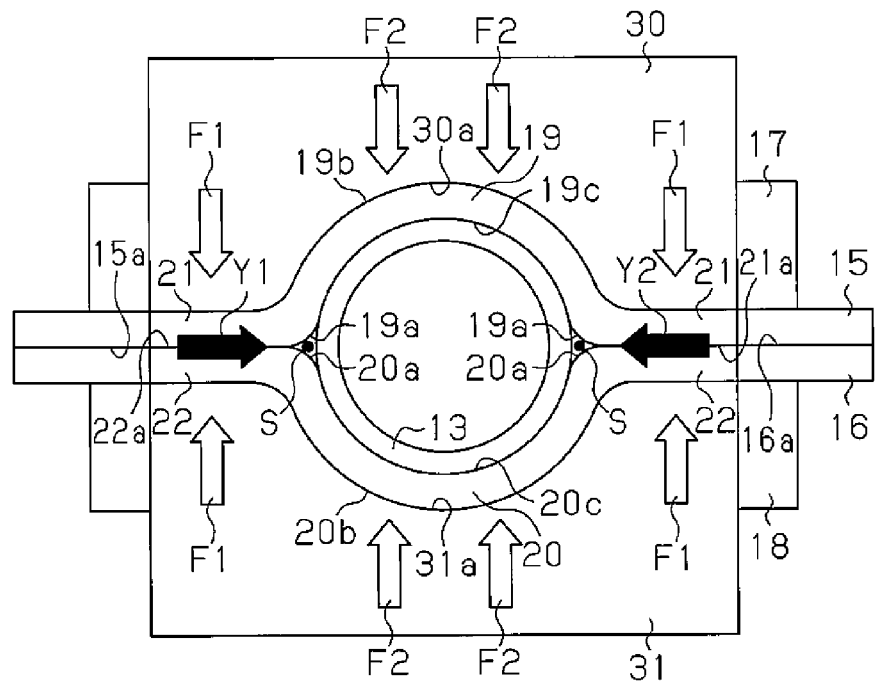
FIG. 6 is a front view of the heat exchanger upon brazing.
FIG. 7 is a cross-sectional view of the heat exchanger in another embodiment.

As depicted in FIG. 6, the liquefied second brazing filler metals 23 and 24 are pushed into the gap S by holding forces F1 given by the jigs 30 and 31 as depicted with arrows Y1 and Y2. With the liquefied second brazing filler metals 23 and 24 pushed into the gap S, the brazing filler metals are filled into the gap S to fill up the gap S.

Moreover, although the plates 15 and 16 tend to deform due to thermal expansion, the outer circumference surfaces 19b and 20b of the first and second groove portions 19 and 20 are held by holding forces F2 given by the jigs 30 and 31 (refer to FIG. 6). Accordingly, the deformation due to thermal expansion is suppressed. Accordingly, formation of the gaps between the pipe 13 (14) and the first and second groove portions 19 and 20 by the deformation of the plates 15 and 16 is suppressed.

Then, by cooling a target object to be brazed in a state where the jigs 30 and 31 hold the outer circumference surfaces 19b and 20b of the first and second groove portions 19 and 20 and the first and second flanges 21 and 22, the brazing of the first and second plates 15 and 16 and the pipes 13 and 14 is completed. A brazing step includes the heating step of melting brazing filler metals while holding the plates 15 and 16, and the cooling step of cooling the melted brazing filler metals as described above.

Next, the operation of the heat exchanger 1 brazed in the above brazing method will be described.

An electronic part is attached to the heat exchanger 1 manufactured by the above manufacturing method. When a coolant enters the pipe 13 on one side, the electronic part attached to the outer surface of the heat exchanger 1 is cooled by the coolant and the heated coolant exits the pipe 14 on the other side. Since no gaps are formed between the pipe 13 and the plates 15 and 16, the joint reliability is high.

In other words, as described above, since the edges 19a and 20a of the first and second groove portions 19 and 20 have arc shapes, the first and second groove portions 19 and 20 cannot fully cover the pipe 13 (14). However, brazing filler metals 26 are filled into parts where the first and second groove portions 19 and 20 cannot cover. Thus, no gaps are generated between the first and second groove portions 19 and 20 and the pipe 13. Thus, the joint reliability is increased.

The above embodiment has the following effects.

(1) The first and second flanges 21 and 22 are held by the jigs 30 and 31 upon brazing. Accordingly, when the second brazing filler metals 23 and 24 are liquefied, the second brazing filler metals 23 and 24 are pushed out by a holding force(s) given by the jigs 30 and 31. The second brazing filler metals 23 and 24 thus pushed out are filled into the gap S between the pipe 13 (14) and the first and second groove portions 19 and 20 of the plates 15 and 16. Thus, even if the edges 19a and 20a of the first and second groove portions 19 and 20 are not right angled, generation of a gap between the body portion 12 and the pipe 13 in the heat exchanger 1 is suppressed, and the joint reliability is increased.

(2) The first and second flanges 21 and 22 are held by the jigs 30 and 31 upon brazing. Accordingly, deformation of the first and second flanges 21 and 22 due to thermal expansion upon brazing is suppressed. The gaps are hard to generate between the plates 15 and 16 and the pipes 13 and 14.

(3) Since it is possible to suppress the gap generation even if the edges 19a and 20a of the first and second groove portions 19 and 20 are not right angled, the manufacturing of plates is facilitated.

(4) The brazing is conducted while the outer circumference surfaces 19b and 20b of the first and second groove portions 19 and 20 are held by the jigs 30 and 31. Thus, deformation of the plates 15 and 16 due to thermal expansion are suppressed. Accordingly, formation of the gap is suppressed between the first and second groove portions 19 and 20 and the pipe 13 upon brazing. The joint reliability of the heat exchanger 1 is increased.

(5) The step of brazing the body portion 12 by brazing the plates 15 and 16 and the step of brazing the pipe are integrated into one step. This enables batch blazing and saves the time for the manufacturing step.

(6) It is possible to control the thickness of a brazing filler metal to fill up the gap S with the relationship between the holding force(s) and the thickness of a brazing filler metal. Thus, the thickness of a brazing filler metal can be determined.

The embodiments of the invention are not limited to the above embodiment and may be embodied as follows.

In the placement step, only the first and second flanges 21 and 22 may be held by the jigs 30 and 31. In this case, liquefied blazing filler metals are pushed into the gap S from the first and second flanges 21 and 22.

In the above embodiment, both of the inner surfaces 21a and 22a of the first and second flanges 21 and 22 are covered with the second brazing filler metals 23 and 24. Alternatively, either of the inner surfaces 21a and 22a of the flanges 21 and 22 may be covered with the second brazing filler metals 23 and 24. In short, it is sufficient if the second brazing filler metals 23 and 24 are placed such that any one of the inner surfaces 21a and 22a of the first and second flanges 21 and 22 is covered with the second brazing filler metals 23 and 24.

In the above embodiment, both of the mating surfaces 15a and 16a of the first and second plates 15 and 16 are covered with the first brazing filler metals 25. Alternatively, either of the mating surfaces 15a and 16a may be covered with the first brazing filler metals 25. In short, it is sufficient if the first brazing filler metals 25 are placed in a manner to cover any one of the mating surface 15a of the first plate 15 and the mating surface 16a of the second plate 16.

The edges 19a and 20a of the first and second groove portions 19 and 20 may be right angled as in JP2008-224134A. Also in this case, formation of a gap between the body portion 12 and the pipe 13 with the jigs 30 and 31 is suppressed by suppression of deformation by the jigs 30 and 31.

In terms of the shapes of the pipes 13 and 14, a pipe having a cross-sectional circular shape as depicted in FIGS. 3A to 6 may be used, or other pipe such as a square-shaped pipe may be used. In other words, as long as a coolant can be supplied to the coolant flow passage 11, a pipe may be in any shape. In this case, the shapes of the groove portions 19 and 20 of the plates 15 and 16 are also changed to fit to the pipes.

The step of brazing the plates 15 and 16 and the pipes 13 and 14 is not limited to batch brazing, but the step of brazing may include separate steps for the step of brazing the body portion 12 and the step of brazing the body portions 12 with the pipes 13 and 14.

As depicted in FIG. 7, the first and second flanges 21 and 22 may have shapes where outer end faces of the flanges 21 and 22 are open. In this case, brazing filler metals 27 are accumulated at the outer end portions when the brazing filler metals are pushed to the outer end surface sides. Accordingly, the brazing filler metals flow to the outside from the outer end portions, and the brazing filler metals for closing up the gap S do not run short.

What is claimed is:

1. A method of joining a pipe to a heat exchanger, the heat exchanger including
a body portion including a first plate and a second plate, each of the first and second plates having a mating surface, wherein a coolant flow passage is formed by brazing the first plate and the second plate by use of a first brazing filler metal covering the mating surface of at least one of the first plate and the second plate;
a first groove portion provided in the first plate, wherein the first groove portion includes an inner surface;
a second groove portion provided in the second plate, wherein the second groove portion includes an inner surface; and a pipe brazed between the first groove portion and second groove portion by use of a second brazing filler metal covering the inner surface of the first and the inner surface of the second groove portions, the method comprising:

covering, with the second brazing filler metal, at least one of inner surfaces of a pair of first flanges and inner surfaces of a pair of second flanges, wherein the pair of first flanges is provided contiguously with the first groove portion in a direction approximately orthogonal to a laminated direction of the first and second plates and an axial direction of the pipe and the pair of second flanges is provided contiguously with the second groove portion in a direction approximately orthogonal to the laminated direction of the first and second plates and the axial direction of the pipe;

placing the pipe between the first groove portion and second groove portion with the second brazing filler metal interposed between the pipe and each of the first and second groove portions;

holding the first and second flanges by jigs with the second brazing filler metal interposed between each of the first and second pairs of flanges; and brazing by melting the second brazing filler metal to liquefy the second brazing filler, filling a gap between the first and second groove portions and the pipe with the liquefied second brazing filler metal, and cooling the second brazing filler metal, wherein the second brazing filler metal is pushed into the gap by a holding force given by the jigs.

2. The method according to claim 1, further comprising holding the first and second groove portions by the jigs when holding the first and second flanges by the jigs.

* * * * *